UNITED STATES PATENT OFFICE.

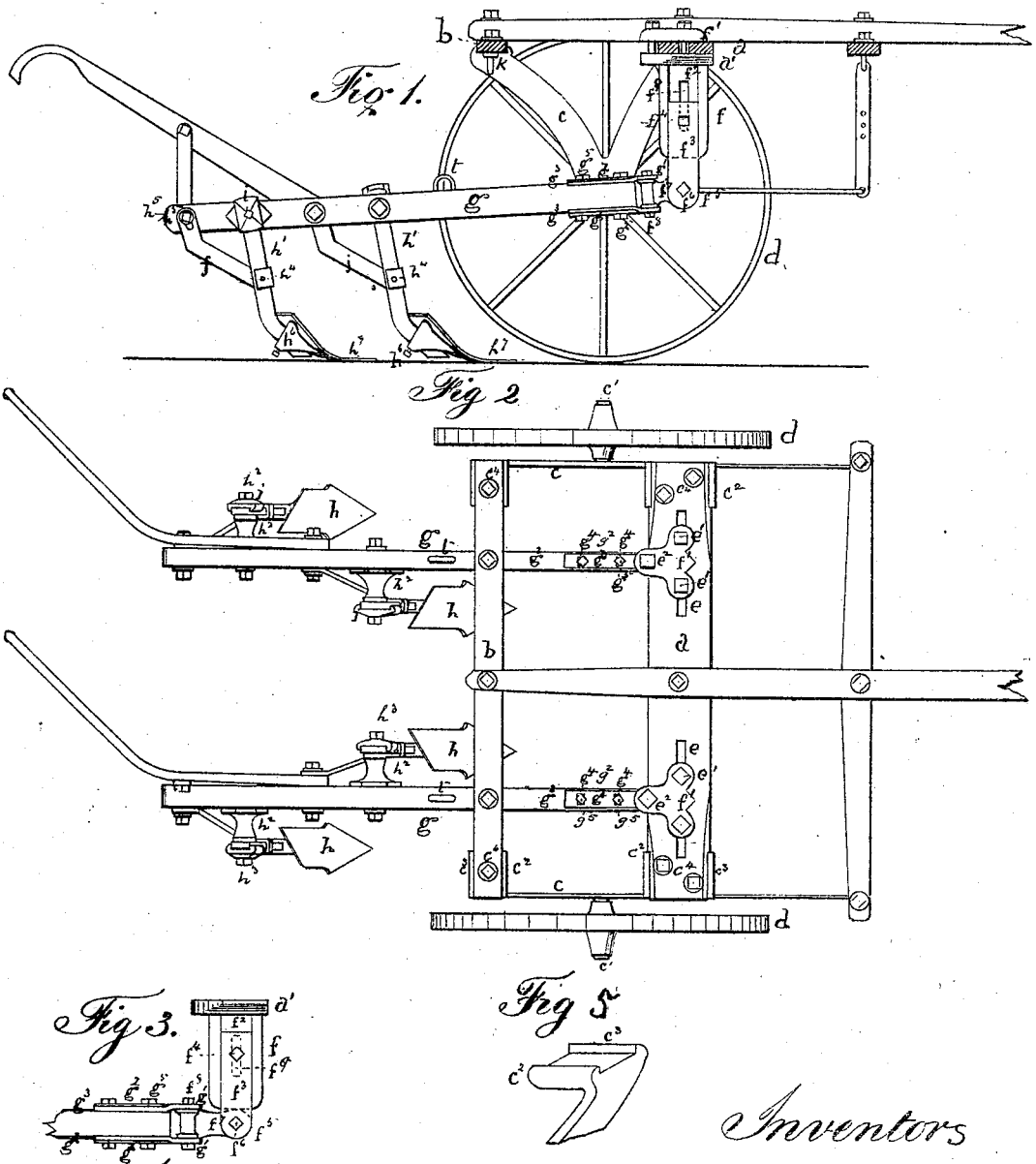

MATTHEW P. SIMPSON, OF PANA, AND JOSEPH P. ELLACOTT, OF SHELBYVILLE, ASSIGNORS TO THE SHELBYVILLE MANUFACTURING COMPANY, OF SHELBYVILLE, ILLINOIS.

IMPROVEMENT IN CULTIVATORS.

Specification forming part of Letters Patent No. 140,437, dated July 1, 1873; application filed May 16, 1873.

*To all whom it may concern:*

Be it known that we, MATTHEW P. SIMPSON, of Pana, Christian county, and JOSEPH P. ELLACOTT, of Shelbyville, in the county of Shelby and State of Illinois, have invented certain new and useful Improvements in Cultivators; and we do hereby declare the following to be a full, clear, and exact description of the invention, such as will enable others skilled in the art to which it pertains to make and use it, reference being had to the accompanying drawings, which form a part of this specification.

Our invention relates to improvements in cultivators, whereby the various parts may be readily adjusted, while at the same time lightness and durability are obtained.

But, that our invention may be fully understood, we will proceed to describe the same in detail by the aid of the accompanying drawings.

Figure 1 is a section, Fig. 2 a plan, and Figs. 3, 4, and 5 detail views, of apparatus arranged according to our invention.

$a$ is the front, and $b$ the rear, cross-piece, to the under side of each end of which a forked forging or casting, $c$, is affixed. The forked forgings or castings $c$ are provided at their lower ends with axles $c^1$, upon which the supporting-wheels $d$ revolve. The upper ends of each forked forging or casting $c$ are provided with an extended flange, $c^2$, having ribs $c^3$ formed thereon, between which the cross-pieces $a$ and $b$ are fitted and firmly retained by the aid of bolts and nuts $c^4$, without necessitating the employment of braces. The front cross-piece $a$ is provided with slots $e$ for the passage of screw-bolts $e^1$, whereby the draw-heads $f$ are attached in such a manner that they may be brought nearer to or further from each other, thereby regulating the distance of the gangs $g$ coupled thereto one from another. The draw-heads $f$ are attached to the front cross-piece by means of a plate, $f^1$, and three bolts, $e^1$, $e^1$, and $e^2$. The two bolts $e^1$ $e^1$ pass through the slots $e$, before referred to, while the bolts $e^2$ pass at the rear of the same, and into the capital $a^1$ of the draw-head. The draw-heads $f$ are formed with grooves or recesses $f^2$ on each side, for the reception of a pair of bars or rods, $f^3$, which are arranged to slide therein, when required, while at other times they are retained in position by screw-bolts $f^4$ working in slots $f^9$ in the draw-heads. The lower ends of the bars or rods $f^3$ are formed with bearings $f^5$ for the reception of a bolt, $f^6$, by means of which the gangs are connected with the draw-heads. The object of the sliding bars or rods $f^3$ is to allow of the position of the gangs $g$ being raised or lowered, and consequently the depth of furrows cut by the apparatus determined. Between the lower ends of the bars or rods $f^3$ a connecting-piece, $f^7$, is arranged, one end of which is connected thereto by bolt $f^6$, while the opposite end is pivoted to the end of the gang-beam $g$ in such manner that the bolts $f^6$ and $f^8$, at each end of the connecting-piece $f^7$, are at right angles one to the other. Plates $g^1$ are attached to the upper and lower sides of the gang-beam $g$, the front ends of which are arranged to form bearings for the reception of the bolt $f^8$ of the connecting-piece $f^7$, while the remaining portion $g^2$ of each is formed concave in the direction of its length, in such manner that the said plates $g^1$ may be turned on the gang-beam $g$, which is formed with a corresponding convex surface, $g^3$, on its upper and lower side. Slots $g^4$ are formed in the concave plates $g^1$, so that the retaining-bolts $g^5$ may slide therein when required.

By forming the upper and lower surfaces $g^3$ of the gang-beams $g$ convex and the plates $g^1$ concave the angles of the beam may be adjusted, whereby the gangs are prevented from being forced out of the line of draft when both shares $h$ are arranged to throw the earth in the same direction. The tendency, when both shares are so arranged and the beam $g$ is set perpendicular, is to crowd the gang in the opposite direction. This difficulty is, however, obviated by setting the beam at an angle, so as to give the shares a set in the direction in which the earth is thrown, thereby causing the opposite or outer share to work deeper in the soil, thus balancing and overcoming the tendency to crowd out of a direct line.

The shares $h$ are supported and held in position by standards $h^1$, attached at their upper ends to projections $h^2$ from the gangs $g$ by means of screw-nuts $h^3$. Grooved caps $i$ are applied to the upper ends of the standards $h^1$, where they are attached to the beams $g$, in order to give greater strength and rigidity thereto. The standards $h$ are held in position by angular braces $j$, arranged in the rear of the same. The braces $j$ are formed at their front ends to embrace the standards $h^1$ in front, and are retained in their proper position by the safety wooden pins $h^4$, while at their rear ends they are provided with slots or grooves, through which the retaining-bolts $h^5$ pass, whereby the same are firmly affixed to the beam $g$ with capability of adjustment. The shares $h$ are formed with elongated backs $h^6$, extending down toward the point $h^7$, in order to give greater strength to the shares. The rear cross-pieces are provided with hooks $k$, so arranged that by raising the gangs $g$ such gangs $g$ may be supported away from the ground by passing the loops or eyes $t$ affixed to the gangs $g$ over such hooks $k$.

Having thus described our invention, what we claim, and desire to secure by Letters Patent, is—

1. The combination of the draw-heads $f$, grooves or recesses $f^2$, bars or rods $f^3$, and connecting-pieces $f^7$, substantially as shown and described.

2. In combination, the draw-head $f$, grooves or recesses $f^2$, bars or rods $f^3$, connecting-piece $f^7$, plates $g^1$, and convex surfaces $g^3$, substantially as specified.

3. The plates $g^1$, formed with concave surfaces $g^2$, in combination with the convex surfaces $g^3$, substantially as described.

4. The combination of the draw-head $f$ provided with the grooves $f^2$ and slot $f^9$ with the slotted bar $a$, bars $f^3$, connecting-piece $f^7$, concave plates $g^1$, convex surfaces $g^3$, gangs $g$, when constructed, arranged, and operating substantially as described, and for the purpose set forth.

In testimony that we claim the foregoing we have hereunto set our hands this 28th day of April, 1873.

MATTHEW P. SIMPSON.
JOSEPH P. ELLACOTT.

Witnesses:
FRANK W. PENWELL,
WALTER C. HEADEN.